(12) United States Patent
Gu et al.

(10) Patent No.: US 6,345,088 B1
(45) Date of Patent: Feb. 5, 2002

(54) APPARATUS AND METHODS FOR HANDLING CALL WAITING IN A MODEM

(75) Inventors: Bin Lang Gu, Sunnyvale; Chuang Li, Saratoga, both of CA (US)

(73) Assignee: Actiontec Electronics, Inc., Sunnyvale, CA (US)

( * ) Notice: Subject to any disclaimer, the term of this patent is extended or adjusted under 35 U.S.C. 154(b) by 0 days.

(21) Appl. No.: 09/372,418

(22) Filed: Aug. 11, 1999

(51) Int. Cl.[7] .............................................. H04M 11/00
(52) U.S. Cl. ................. 379/93.35; 379/90.01; 379/93.28; 375/222
(58) Field of Search ........................... 379/90.01, 93.28, 379/95.35, 215, 100.01, 100.15; 375/222, 377; 358/407

(56) References Cited

U.S. PATENT DOCUMENTS

| | | | |
|---|---|---|---|
| 4,852,151 A | 7/1989 | Dittakavi et al. | 379/97 |
| 5,287,401 A | 2/1994 | Lin | 379/98 |
| 5,491,744 A | 2/1996 | Kikinis | 379/215 |
| 5,550,908 A | 8/1996 | Cai et al. | 379/215 |
| 5,651,060 A | 7/1997 | Cohn et al. | 379/215 |

FOREIGN PATENT DOCUMENTS

WO   WO 99/14924   3/1999   ............ H04M/3/42

*Primary Examiner*—Duc Nguyen
*Assistant Examiner*—Melur Ramakrishnaiah
(74) *Attorney, Agent, or Firm*—Fish & Neave; Nicola A. Pisano

(57) ABSTRACT

A modem that handles interruptions caused by call waiting signals is described. When the modem detects a call waiting signal, the modem alerts the user to the presence of the call waiting signal, and permits the user to answer the incoming call by taking a local phone that is connected to the modem off-hook. When the local phone is taken off-hook, the modem automatically generates a hook-flash signal to switch to the incoming call. When the user places the local phone back on-hook, the modem generates another hook-flash signal to resume (if possible) the modem connection. Additionally, the modem prevents a "fallback", in which the modem switches from its current protocol to a lower-speed protocol, during a "retrain" process caused by a call waiting event.

27 Claims, 2 Drawing Sheets

APPARATUS AND METHODS FOR HANDLING CALL WAITING IN A MODEM

FIELD OF THE INVENTION

The present invention relates generally to providing a modem with an ability to handle call waiting. More specifically, the present invention provides apparatus and methods for maintaining a modem connection and line speed despite interruptions caused by call waiting signals.

BACKGROUND OF THE INVENTION

As Internet use continues to grow, an increasing number of home users are using a modem connected to a personal computer to access the Internet. Many of these home users have only a single telephone line coming into their home, and during lengthy sessions of Internet use, this phone line may be busy handling data traffic for extended periods of time, preventing other telephone calls from getting through.

Call waiting is a feature available on most residential telephone connections that informs a telephone user that a third party is trying to call while the telephone is in use. Typically, this is achieved by producing a special call waiting tone (generally a short beep) on the phone line to inform the user that someone is trying to call. The user may choose to place the current call on hold and accept the incoming call by sending a "flash" signal. Alternatively, the user may ignore the incoming call, or hang up on the current call, and accept the incoming call. Using call waiting, it is possible for a telephone user with a single telephone line to avoid missing calls while the telephone line is in use.

Unfortunately, call waiting does not typically solve the problem faced by modem users who have only a single telephone line. During modem use, the user typically does not hear the call waiting signal, so is unable to take the incoming call. Worse, the call waiting signal may interfere with a modem's signals, causing many modems to drop their connection.

On some high-speed modems, even if the call waiting signal does not cause the modem connection to drop, the connection speed may be affected. For example, on a 56 kilobits/second modem supporting the ITU V.90 standard, telephone line conditions can cause the modem to "retrain" the communication speed, and decrease the speed if the line quality is too poor to support higher speeds. If the speed drops into a range at which the lower-speed CCITT V.34 protocol would be more reliable, the modem will typically switch to the V.34 protocol. The speed range at which V.34 becomes more reliable is implementation dependent, but is typically approximately 28 to 33 kilobits/second. Once the modem is using the V.34 protocol, it will not be able to retrain to increase the speed above 33.6 kilobits/second, since that is the maximum speed of the V.34 protocol, and the V.34 protocol does not provide an ability to switch back up to the higher-speed V.90 protocol.

The call waiting signal, as well as other signals associated with handling call waiting, such as turning relays on and off, hook-flash signals, taking local telephone devices off-hook, and so on, may appear to a modem to be line noise, causing the modem to retrain to a lower speed. If the decrease in speed causes the modem to fallback to the V.34 protocol, the call waiting signal may cause the modem to work at a slow speed as long as the modem is connected—even after the call waiting signal has ended.

Numerous attempts have been made to solve some of the problems associated with call waiting and modems. For example, many manufacturers have produced devices that plug into a telephone line, and produce a distinctive sound or other indication when a call waiting signal is detected. When using such a device in combination with a modem, the user will hear the distinctive sound when a call waiting signal occurs, and will be able to decide whether to pick up the incoming call. Since they are separate from a modem, such devices do not address the possibility that the modem connection may be dropped due to the call waiting signal, or the possibility of connection speed reductions due to retraining caused by the call waiting signal.

In U.S. Pat. No. 4,852,151, to Dittakavi et al., a call waiting detection device is combined with a modem. The modem is capable of detecting a call waiting signal, and of informing the user, either through a message on the computer screen, or though some other indicator, that a call waiting signal has been detected. The user is given the option of picking up the incoming call, or ignoring the call waiting signal. Additionally, Dittakavi et al. suggests that setting the S10 register—that controls the delay time from loss of carrier to hang up—to a high enough value will prevent the modem from dropping the line (i.e. hanging up) when a call waiting signal occurs. Dittakavi et al. fails to address the loss of speed that may occur as a result of retraining, or the possibility that the speed may drop below a level from which it cannot recover (i.e., by switching the protocol from V.90 to V.34).

U.S. Pat. No. 5,550,908, to Cai et al., is directed to a modem that can handle caller ID on call waiting service. The device described by Cai et al. can detect a call waiting signal, and receive a caller ID associated with the call waiting signal. The user is alerted of the presence of the call waiting signal, and of the caller ID of the incoming call. The user may then choose whether to ignore the incoming call, or to answer the incoming call. Cai et al. handles the possibility of the modem dropping the line due to the call waiting signal in a manner similar to Dittakavi et al., by adjusting the S10 register, that controls the time between loss of carrier and hangup. Cai et al. also addresses retraining, by acknowledging that retraining may be necessary to reestablish communications after the call waiting signal. Additionally, Cai et al. attempts to prevent retraining failure by not starting a retrain sequence until after a second call waiting signal is received within a predefined period of time. Cai et al. does not address the loss of speed that may occur as a result of retraining, or the possibility that the speed may drop below a level from which it cannot recover.

Other attempts to handle difficulties encountered when using a modem with call waiting require changes to the overall telephone system, or to the equipment and methods used by the provider of telephone service. For example, in U.S. Pat. No. 5,491,744, to Kikinis, the central telephone switching system determines whether a subscriber's telephone is being used for voice or data transmissions when an additional call comes in. If the central switching system detects a voice transmission, it sends a call waiting signal. If a data transmission is detected, the central switching system will avoid interrupting the transmission with a call waiting signal.

Systems of this sort, which require changes in a central telephone switching system, are not within the control of a telephone user, and must be implemented by telephone service providers. While such solutions may be offered by providers in the future, they are not generally available at the present time.

In view of the above, it is an object of the present invention to provide apparatus and methods to permit a modem to inform a user of call waiting signals, and to handle call waiting signals without losing the connection, and without switching from the current protocol to a lower-speed protocol, from which the modem may not recover.

It is a further object of the present invention to provide a combined modem and call waiting device having relatively low manufacturing cost and improved call waiting signal detection, the modem handling call waiting signals without losing the connection, and without switching from the current protocol to a lower-speed protocol, from which the modem may not recover.

SUMMARY OF THE INVENTION

It is an object of the present invention to provide apparatus and methods to permit a modem to inform a user of call waiting signals, and to handle call waiting signals without losing the connection, and without switching from the current protocol to a lower-speed protocol, from which the modem may not recover.

It is a further object of the present invention to provide a combined modem and call waiting device having relatively low manufacturing cost and improved call waiting signal detection, the modem handling call waiting signals without losing the connection, and without switching from the current protocol to a lower-speed protocol, from which the modem may not recover.

These and other objects of the present invention are achieved by providing a modem that detects and handles the call waiting signal. The modem comprises a main hook switch, that connects the modem circuitry to a telephone line, a local phone switch, that connects a local telephone device connected to the modem to the telephone line, and a sensor that determines whether the local telephone device is on-hook or off-hook. Additionally, the modem comprises a CODEC and/or DSP that detects a call waiting signal, an MPU that controls the modem, and a ring generator and speaker, that are used to alert the user when a call waiting signal is present.

The modem of the present invention is programmed so that when a call waiting signal is detected, the modem starts a call waiting task that handles the call waiting signal. The call waiting task uses the ring generator and speaker to generate ringing tones, alerting the user that a call waiting signal has been detected. The call waiting task then uses the sensor to determine whether the user takes the local telephone device off-hook. If the local telephone device is taken off-hook, the call waiting task sends a hook-flash signal to the local telephone company, to switch to the incoming call. When the user places the local telephone device back on-hook, a second hook-flash signal is sent to the telephone company, to switch back to the original modem connection.

The call waiting task executes concurrently with a task that may attempt to "retrain" the connection speed of the modem during a call waiting event, such as a call waiting signal. The "retrain" procedure of the modem of the present invention prevents a "fallback", in which the modem switches from its current protocol to a lower-speed protocol (e.g., from V.90 to V.34), if the retrain procedure occurs as a result of a call waiting signal, or due to call-waiting activity. This may be achieved by determining if a suitable communication rate of the modem has fallen below a threshold, below which a fallback may occur. If so, the modem determines whether the fallback will be permitted based on whether the retrain occurred as a result of a call waiting event. Alternatively, the modem of the present invention may prevent a fallback by not permitting the suitable communication rate to fall below its previous level during a call waiting event.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
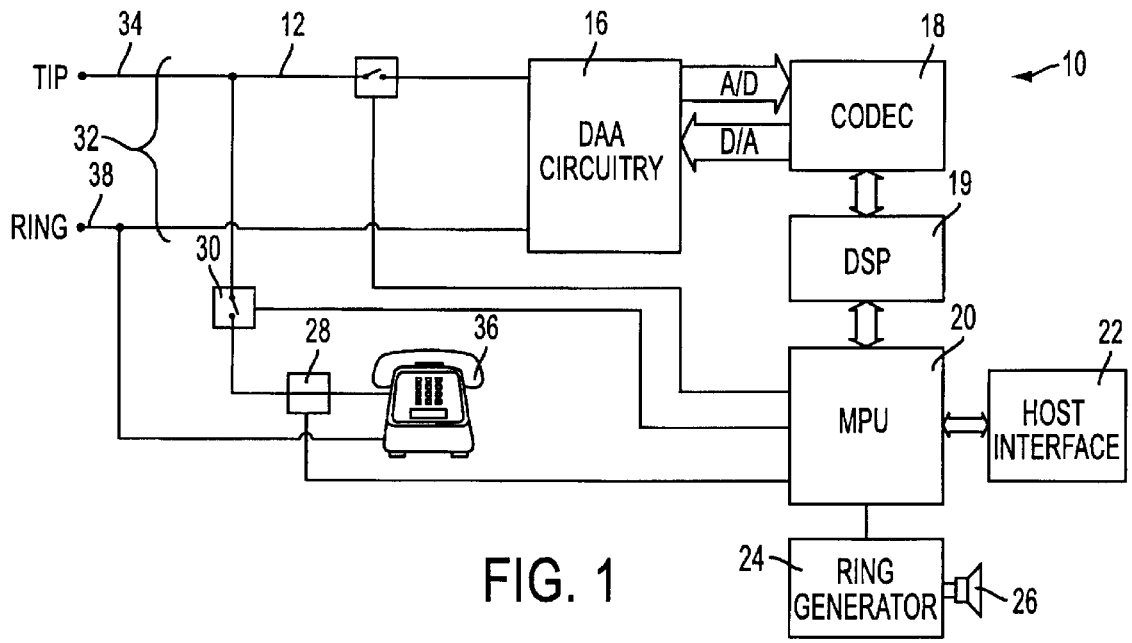
FIG. 1 is a block diagram of a modem built in accordance with the principles of the present invention.

Referring to FIG. 1, a block diagram of the circuitry of a modem built in accordance with the principles of the present invention is shown. Modem 10 comprises main hook switch 12, data access arrangement (DAA) circuitry 16, CODEC 18, DSP 19, MPU 20, host interface 22, ring generator 24, speaker 26, current sensor 28, and local phone hook switch 30.

Main hook switch 12, preferably a relay, is connected to tip line 34, and is used to control whether modem 10 is connected, or disconnected. When main hook switch 12 is open, modem 10 is disconnected. When main hook switch 12 is closed, modem 10 is connected. The status of main hook switch 12 is controlled by MPU 20, and may be changed in response to commands issued to modem 10 through host interface 22, or due to detection of conditions on telephone line 32, such as a ring condition.

Data access arrangement (DAA) circuitry 16 is required by required by the FCC, and conforms to regulations and requirements imposed by government, and by providers of access to the public telephone network. DAA circuitry 16 may provide some protection against electrical signals on telephone line 32 that may harm modem 10. Additionally, DAA circuitry 16 may prevent signals generated by modem 10 from harming the public telephone network.

CODEC 18 decodes analog signals sent on telephone line 32 to extract digital data, and encodes digital data to produce analog signals that may be sent across the public telephone network. Data that is decoded by CODEC 18 may be sent to DSP 19 and MPU 20 for further processing, and DSP 19 and MPU 20 may send data to be encoded and transmitted across telephone line 32 to CODEC 18. CODEC 18 also accepts commands from MPU 20 and DSP 19 to control the operation of CODEC 18. CODEC 18 preferably comprises a standard, commercially available modem CODEC, such as those manufactured by Lucent Technologies Inc., of Murray Hill, N.J.

In addition to encoding and decoding data, CODEC 18 detects the state of telephone line 32, and provides information to DSP 19 and MPU 20 on the state of telephone line 32, and of CODEC 18. For instance, CODEC 18 may have state flags to indicate to MPU 20 when a call waiting signal is detected, when a retrain sequence is occurring, and when a retrain sequence is requesting a reduction in communication speed. Alternatively, more complex processing may be required to recognize these signals, in which case recognition of the signals is performed by DSP 19, which conveys the information to MPU 20.

DSP 19 performs various digital signal processing tasks, and may include memory for storing programs. DSP 19 may perform tasks such as reducing noise, or recognizing various types of signals. It will be understood by one skilled in the art that DSP 19 may be combined with MPU 20, or with CODEC 18. Additionally, in a "soft modem", the functions of DSP 19 and MPU 20 may be performed by a host computer.

DSP 19 preferably comprises a standard, commercially available DSP for use in a modem, such as those manufactured by Lucent Technologies Inc., of Murray Hill, N.J. Depending on the model of DSP used, it may be necessary to reprogram a standard, commercially available DSP to provide MPU 20 with access to the required information on call-waiting signals, and to permit MPU 20 to forbid a fallback from the modem's current protocol to a lower-speed protocol.

MPU 20 controls the operation of modem 10. MPU 20 is a microprocessor, and may comprise a processing unit (not shown), program memory (not shown), and data memory (not shown). MPU 20 receives commands and data from a computer or other electronic device through host interface 22, interprets and executes the commands, sends and receives data through CODEC 18 and host interface 22, and controls main hook switch 12. All these are standard, well-known functions performed by typical previously known modems.

Additionally, MPU 20 is programmed to receive state information from CODEC 18 and DSP 19 regarding call waiting signals, and retraining and fallback requests. As will be described in detail hereinbelow, MPU 20 is programmed to handle call waiting signals, and to prevent call waiting signals from causing modem 10 to reduce its communication speed below a level from which the communication speed may not recover (i.e., fallback to a lower-speed protocol). MPU 20 is further programed to control ring generator 24 and local hook switch 30, and to receive signals from current sensor 28.

MPU 20 preferably comprises a standard, commercially available MPU designed for use in a modem or other communication device, programmed in accordance with the principles of the present invention. Lucent Technologies Inc., of Murray Hill, N.J. manufactures suitable MPUs that may be programmed according to the present invention, as do many other manufacturers. Additionally, in a "controllerless" modem, the functions of MPU 20 may be performed by the host computer.

It will be understood by one skilled in the art that in some systems, many of the functions of MPU 20 and DSP 19 may be performed by the central processing unit (CPU) of a computer system to which the modem is connected (i.e. the host computer). In such systems, CODEC 18 should provide state information to the CPU, which executes software in accordance with the principles of the present invention to handle call waiting situations. Additionally, it should be recognized that some modems combine the functions of DSP 19 and MPU 20 into a single part. Such a combined part, if properly programmed, could be used in accordance with the principles of the present invention.

Host interface 22 provides an interface between modem 10 and a computer or other electronic device. Commands and data are sent from a computer to modem 10 through host interface 22, and responses to commands, data, and status information are sent from modem 10 to the computer through host interface 22. Host interface 22 may comprise a serial interface, a USB interface, a PCI interface, an ISA interface, or any other interface through which computers and peripheral devices may communicate.

Ring generator 24 and speaker 26 are coupled to MPU 20, and are used in a preferred embodiment to generate a tone or ringing sound when a call waiting signal is detected while modem 10 is in use. This tone serves to alert a user, who would otherwise be unaware of the call waiting signal, that a third party is attempting to call on the telephone line that is being used by modem 10.

It will be understood by one skilled in the art that there may be other ways of alerting a user to the presence of a call waiting signal. MPU 20 could generate tones to be sent to a speaker, thereby eliminating the need for ring generator 24. In a less preferred embodiment, that may require that changes be made to the device drivers or operating system of a host computer, the user could be alerted through information sent by MPU 20 to the host computer, which may display an alert message on a screen. Causing a local telephone to ring could also be used to alert the user to the presence of a call waiting signal, but is less preferred, due to electrical requirements. Other methods, such as flashing lights also could be used to alert the user to the presence of a call waiting signal.

Current sensor 28 is coupled to MPU 20, and provides a signal that indicates to MPU 20 whether local phone 36 is on-hook or off-hook when local phone switch 30 is closed. Current sensor 28 provides no useful information to MPU 20 when local phone hook switch 30 is open. Local phone switch 30, preferably a relay, is controlled by MPU 20, and permits MPU 20 to control whether local phone 36 is connected to telephone line 32. If local phone switch 30 is open, the on-hook or off-hook state of local phone 36 does not matter—local phone 36 will not be connected to telephone line 32. If local phone switch 30 is closed, local phone 36 is connected to telephone line 32, and may function as a normal telephone. As is explained in greater detail below, these components are used to permit a user to answer a call waiting call using local phone 36.

Advantageously, by placing the circuitry for call waiting detection and handling on the modem, rather than using a separate device connected to telephone line 32, a higher signal-to-noise ratio is achieved during detection of the call waiting signal. This permits a modem built according to the principled of the present invention to accurately detect call waiting signals. Additionally, integrating the circuitry to detect and handle call waiting signals with the modem circuitry decreases the manufacturing costs of the call waiting detection circuitry, compared to the cost of manufacturing a separate call waiting detection device.

Figure 2:
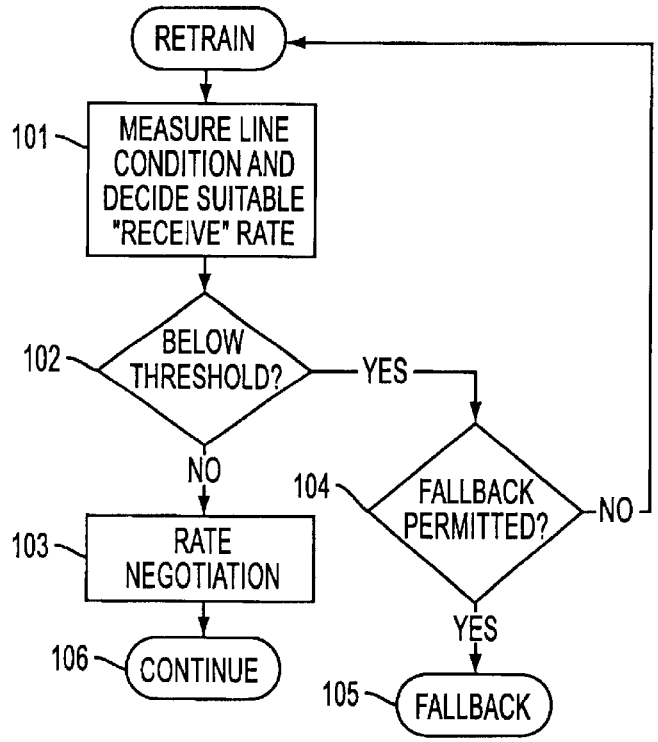
FIG. 2 is a flowchart of the "retrain" procedure of a modem built in accordance with the principles of the present invention.

Referring now to FIG. 2, the "retrain" sequence of a modem built in accordance with the principles of the present invention is shown. Modem 10 may execute this sequence when the signal-to-noise ratio falls below a predetermined threshold, or under other circumstances, such as when a carrier signal is reestablished after a carrier loss. Such a degradation of the signal-to-noise ration or loss and reestablishment of the carrier signal may occur as the result of a call waiting signal, or other call waiting-related activity, such as hook-flash signals. This process may be performed by DSP 19, by MPU 20, or partially be DSP 19 and partially by MPU 20. Additionally, it will be understood that there are many steps in a retrain sequence of a typical modem. These methods are well known in the art, and are not repeated here. FIG. 2 shows only a portion of the retrain process that is needed to illustrate the present invention.

At step 101, after completing a portion of the retrain process, modem 10 measures the line condition of the telephone line, and based on its measurements, decides on a suitable "receive" rate. The process of measuring the line condition is known in the art, and may involve sending test signals, examining the frequency response of the line, and so on. In the V.90 protocol, the receive rate and the transmit rate may differ. Typically, a modem has control in the retrain only over its receive rate, while the modem at the other end of the connection has control over the local modem's transmit rate. Therefore, unless a fallback occurs, modem 10 will only choose a suitable receive rate.

At step 102, the receive rate is checked to see if it is below a threshold value. The threshold value may be a speed threshold below which modem 10 may decide that a lower-speed protocol would be more reliable, and may therefore "fallback" to the lower-speed protocol. For instance, on a V.90 modem, this threshold would typically be between 28 and 33 kilobits per second, below which the modem may switch to the lower-speed V.34 protocol. Once the modem switches to the lower-speed protocol, it will typically not be able to switch back up to the higher-speed protocol.

Alternatively, the threshold value may be a value such as a previous data receive rate of modem 10. By using such a threshold value, modem 10 may be prevented from executing a fallback any time the receive rate would be reduced from its previous value.

If the receive rate is not below the threshold value, then the modem is in no immediate danger of switching to a lower-speed protocol, and so the retraining process can continue with communication rate negotiation (step 103). This rate negotiation is preferably similar to the rate negotiation step of a typical modem, and is well known in the art. Following the rate negotiation, modem 10 continues with its operation (step 106), sending and receiving data, or performing other tasks.

If the receive rate was below the threshold value, then at step 104, modem 10 must decide whether a fallback to a lower-speed protocol will be permitted. In accordance with the principles of the present invention, this decision is made based on whether a call waiting signal, or other call waiting-related event is in progress. If retraining is occurring during a call waiting event, then a fallback should generally not be permitted, since it is probable that the conditions that caused the retraining were due to the call waiting event, and are therefore artificial and temporary. If there is no call waiting event in progress when the retraining occurs, then the fallback is probably due to actual line conditions, and generally should be permitted.

There are several ways that this policy can be implemented. In a first preferred embodiment, a timer may be used to determine whether a fallback should be permitted. When a call waiting event, such as a call waiting signal occurs, a special "fallback timer" is started. Until this fallback timer expires, no fallback will be permitted. The fallback timer may prevent a fallback from occurring for as long as 20 seconds or longer following a call waiting event.

In a second preferred embodiment, a counter is used to prevent a fallback until a predetermined number of retrain attempts have been made following a call waiting event. Since each retrain attempt takes at least several seconds, this method may prevent a fallback from occurring within a considerable period of time following a call waiting event. To implement this embodiment, a "fallback counter" may be set each time a call waiting event occurs.

In a third embodiment, a fallback will never be permitted. This will cause the modem to continually attempt to retrain during call waiting events, or during other conditions that would normally cause a fallback to a lower-speed protocol. It should be noted that refusing to fallback may cause a retrain failure. Most modems will disconnect after a predetermined of retrain failures have occurred. Thus, this method may cause the modem to be disconnected if the call waiting event or other conditions responsible for dropping the suitable receive rate below the threshold value persist longer than the time required for several retrain failures.

In a similar embodiment, a flag is set when a call waiting event occurs, and is cleared when the call waiting event is over. If the flag is set when the decision on permitting a fallback is made, a fallback will not be permitted. As above, if the call waiting event lasts for longer than the amount of time required for several retrain failures, the modem may be disconnected.

In accordance with the principles of the present invention, a fallback may also be prevented at step 101 by ensuring that the suitable receive rate is not lower than a previous suitable receive rate if modem 10 is handling a call waiting event. This can be determined through use of a timer, counter, or flag, as described hereinabove. By artificially holding the suitable receive rate at a high level, the rate will not fall below the threshold value during a call waiting event. As above, this may lead to repeated retrain failures, which may cause the modem to disconnect.

If the fallback is permitted, at step 105, modem 10 switches to the lower-speed protocol, and handles any other known tasks, such as renegotiation, and so on that must be handled by a typical modem when a fallback occurs. If the fallback is not permitted, modem 10 refuses to fallback, possibly causing a retrain failure, and reenters the retrain sequence. The modem may be disconnected if the number of consecutive retrain failures exceeds a preset limit.

Figure 3:
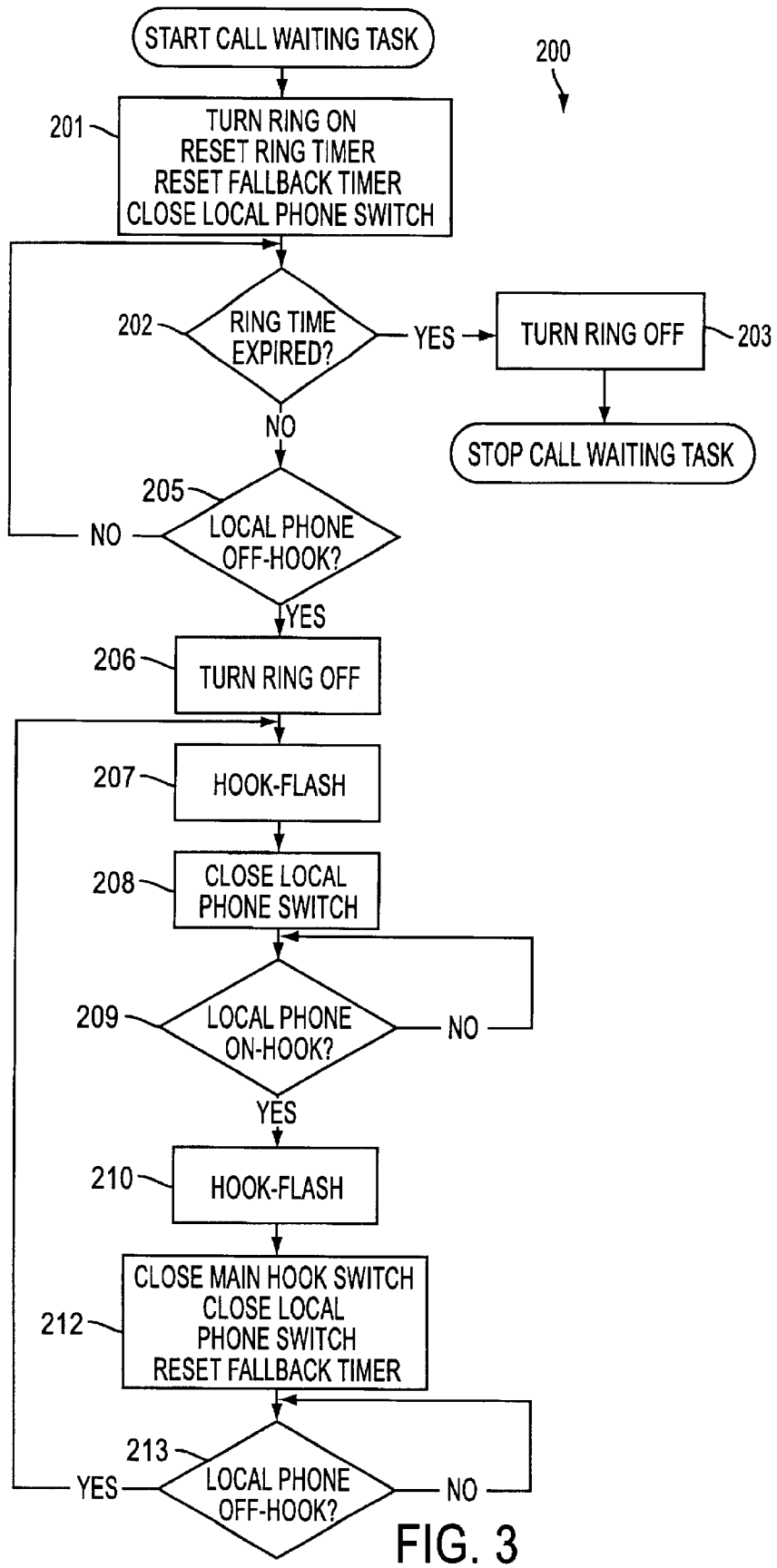
FIG. 3 is a flowchart of the call waiting task of a modem built in accordance with the principles of the present invention.

Referring now to FIG. 3, the call waiting task of a modem built in accordance with the principles of the present invention is described. Call waiting task 200 executes concurrently with other tasks controlling modem 10, such as the retrain sequence described hereinabove with reference to FIG. 2.

In step 201, call waiting task 200 resets the fallback timer (or, alternatively, sets the fallback counter), resets a ring timer, closes local phone switch 30, and sends a signal to ring generator 24 to start generating ring signals to alert the user that a call waiting signal has been detected. Alternatively, a less preferred method could be used to alert the user, such as sending a signal to the host computer to cause the host computer to alert the user, ringing local phone 36, or flashing a light.

In step 202, call waiting task 200 checks to see if the ring time has expired by checking the ring timer. If the time has expired, the call waiting event is over, and the user did not respond. The task sends a signal to ring generator 24 to stop ringing (step 203), and stops the call waiting process.

If the ring time has not expired, call waiting task 200 checks to see if the user has taken local phone 36 off-hook (step 205). This determination can be made by checking current sensor 28. If local phone 36 is off hook, then the user wishes to answer the incoming call using call waiting. Otherwise, execution returns to step 202, and call waiting task 200 continues to check the call waiting timer and local phone off-hook status.

At step 206, the user has taken local phone 36 off-hook to answer the incoming call. It is therefore necessary for call waiting task 200 to signal ring generator 24 to stop ringing.

Next, at step 207, call waiting task 200 generates a hook-flash signal that lets the public telephone system know that the user wishes to switch to the incoming call. The hook-flash signal is generated by opening both main hook switch 12 and local phone switch 30, and quickly closing at least one of them. In this case, local phone switch 30 is closed (step 208), connecting local phone 36 to telephone line 32, permitting the user to talk, receive a fax, or perform any other function using telephone line 32. While this activity is taking place, the modem connection is on hold. If the modem connection remains on hold for too long, the connection may be dropped. In a preferred embodiment of the present invention, a modem signal may be lost for 25 seconds or longer before modem 10 will disconnect.

At step 209, call waiting task 200 checks to see if the user has placed local phone 36 back on-hook. If not, the system simply continues checking. When the user is finished with the call, he or she places local phone 36 back on-hook.

At step 210, call waiting task 200 generates another hook-flash signal by opening main hook switch 12 and local phone switch 30. This hook-flash signal causes the public telephone to reconnect the original modem connection. At step 212, call waiting task 200 closes main hook switch 12, finishing the hook-flash, and connecting modem 10 to telephone line 32. Call waiting task 200 may also close local phone switch 30, so the hook status of local phone 36 may be monitored using current sensor 28. Additionally, the fallback timer (or fallback counter) is reset, to prevent retraining from immediately dropping the connection speed below a level from which the speed cannot be recovered.

At step 213, call waiting task 200 checks to see if the user takes local phone 36 off-hook. If so, execution jumps back to step 207. Otherwise, call waiting task 200 continues to check the hook status of local phone 36. This permits the user to repeatedly switch back and forth between the modem connection and the third party connection.

Call waiting task 200 may continue to check the hook status for a predetermined period of time before concluding that the user will not switch back to the third party connection. This period of time may range from 0 to an infinite amount of time, and typically is in the range of 30 to 60 seconds. Once this period of time expires without the user taking local phone 36 off-hook, call waiting task 200 may terminate.

Additionally, call waiting task 200 may be terminated whenever modem 10 enters a "disconnected" state. If call waiting task 200 is performing a hook-flash operation, the hook-flash operation is completed before call waiting task 200 terminates.

Although preferred illustrative embodiments of the present invention are described above, it will be evident to one skilled in the art that various changes and modifications may be made without departing from the invention. For example, the MPU and DSP could be combined into a single part, or the DSP could be programmed to perform the tasks described hereinabove, rather than the MPU. Additionally, many implementation-specific changes could be made in the methods of the present invention, while retaining the same overall structure. It is intended in the appended claims to cover all such changes and modifications that fall within the true spirit and scope of the invention.

What is claimed is:

1. A method of handling a call waiting signal for use with a modem, the method comprising:
   detecting a call waiting signal;
   alerting a user to the presence of the call waiting signal; and
   preventing the modem from switching to a lower-speed protocol during retraining when retraining was caused by the presence of the call waiting signal.

2. The method of claim 1, wherein preventing the modem from switching to a lower-speed protocol during retraining comprises determining that a communication rate has fallen below a threshold value.

3. The method of claim 2, wherein preventing the modem from switching to a lower-speed protocol during retraining further comprises refusing to permit a communication rate to fall below the threshold value.

4. The method of claim 1, wherein preventing the modem from switching to a lower-speed protocol during retraining comprises using a timer to prevent the modem from switching to the lower-speed protocol during a predetermined period of time following the call waiting signal.

5. The method of claim 1, wherein preventing the modem from switching to a lower-speed protocol during retraining comprises refusing to switch to the lower-speed protocol a predetermined number of times following the call waiting signal.

6. The method of claim 1, wherein preventing the modem from switching to a lower-speed protocol during retraining comprises refusing to switch to the lower-speed protocol during a call waiting event.

7. The method of claim 1, wherein preventing the modem from switching to a lower-speed protocol during retraining comprises refusing to switch to the lower-speed protocol.

8. The method of claim 1, wherein alerting the user to the presence of the call waiting signal comprises generating a ringing tone on a speaker attached to the modem.

9. The method of claim 1, further comprising:
   generating a hook-flash signal when the user takes a local phone device connected to the modem off-hook after the user has been alerted to the presence of the call waiting signal;
   detecting when the user places the local phone device back on-hook; and
   generating a hook-flash signal after the user places the local phone device back on-hook.

10. The method of claim 9, wherein preventing the modem from switching-to a lower-speed protocol during retraining comprises using a timer to prevent the modem from switching to the lower-speed protocol during a predetermined period of time after the user places the local phone device back on-hook.

11. The method of claim 9, wherein preventing the modem from switching to a lower-speed protocol during retraining comprises using a counter to prevent the modem from switching to the lower-speed protocol a predetermined number of times after the user places the local phone device back on-hook.

12. A modem that handles a call waiting signal, the modem comprising:
   DSP circuitry that detects the presence of a call waiting signal; and
   an alerting device that alerts a user to the presence of the call waiting signal;
   the modem programmed to:
   send a signal to the alerting device to alert the user to the presence of the call waiting signal; and
   prevent the modem from switching to a lower-speed protocol during retraining when retraining was caused by the presence of the call waiting signal.

13. The modem of claim 12, wherein the modem is further programmed to determine that a communication rate has fallen below a threshold value.

14. The modem of claim 13, wherein the modem is further programmed to refuse to permit a communication rate to fall below the threshold value.

15. The modem of claim 12, wherein the modem is further programmed to use a timer to prevent the modem from switching to the lower-speed protocol during a predetermined period of time following the call waiting signal.

16. The modem of claim 12, wherein the modem is further programmed to refuse to switch to the lower-speed protocol a predetermined number of times following the call waiting signal.

17. The modem of claim 12, wherein the modem is further programmed to refuse to switch to the lower-speed protocol during a call waiting event.

18. The modem of claim 12, wherein the modem is further programmed to refuse to switch to the lower-speed protocol.

19. The modem of claim 12, wherein the alerting device comprises a ring generator and a speaker, and sending a signal to the alerting device causes the ring generator to generate ringing tones.

20. The modem of claim 12, wherein the alerting device comprises a host computer, and sending a signal to the alerting device causes the host computer to alert the user to the presence of the call waiting signal.

21. The modem of claim 12, further comprising:
a main hook switch that selectively connects the modem to a telephone line;
a local phone device connected to the modem;
a local phone switch that selectively connects the local phone device to the telephone line; and
a local phone hook sensor that detects whether the local phone device is off-hook;
wherein the modem is further programmed to:
use the local phone hook sensor to determine when the user takes the local phone device off-hook after the user has been alerted to the presence of the call waiting signal;
generate a hook-flash signal by opening the main hook switch and the local phone switch and then closing the local phone switch when the user takes the local phone device off-hook;
use the local phone hook sensor to determine when the user places the local phone device back on-hook; and
generate a hook-flash signal after the user places the local phone device back on-hook by opening the main hook switch and the local phone hook switch and then closing the main hook switch.

22. The modem of claim 21, wherein the modem is further programmed to use a timer to prevent the modem from switching to the lower-speed protocol during a predetermined period of time after the user places the local phone device back on-hook.

23. The modem of claim 21, wherein the modem is further programmed to use a counter to prevent the modem from switching to the lower-speed protocol a predetermined number of times after the user places the local phone device back on-hook.

24. The modem of claim 21, wherein the local phone hook sensor comprises a current sensor.

25. The modem of claim 21, wherein the modem is programmed to generate a hook-flash signal after the user places the local phone device back on-hook by opening the main hook switch and the local phone hook switch and then closing the main hook switch and the local phone hook switch.

26. The modem of claim 12, wherein the modem is a soft modem, and a host computer performs control and digital signal processing functions of the modem.

27. The modem of claim 12, wherein the modem is a controllerless modem, and a host computer performs control functions of the modem.

* * * * *